United States Patent [19]

Anders

[11] 4,423,960
[45] Jan. 3, 1984

[54] TWIN-SCREW DEGASSING EXTRUDER FOR DEGASSING THERMOPLASTIC MATERIALS OR THE LIKE

[75] Inventor: Dietmar Anders, Hanover, Fed. Rep. of Germany

[73] Assignee: Hermann Berstorff Maschinenbau GmbH, Hanover, Fed. Rep. of Germany

[21] Appl. No.: 281,029

[22] Filed: Jul. 7, 1981

[30] Foreign Application Priority Data

Jul. 16, 1980 [DE] Fed. Rep. of Germany ....... 3026842

[51] Int. Cl.³ .............................................. B29B 1/10
[52] U.S. Cl. ...................................... 366/75; 366/85; 366/88; 366/89
[58] Field of Search ........................ 366/75, 83, 84, 85, 366/88, 89, 79; 159/2 E; 425/203, 204, 208

[56] References Cited

U.S. PATENT DOCUMENTS

| | | | |
|---|---|---|---|
| 2,078,565 | 4/1937 | Dürst et al. | 366/75 |
| 3,085,288 | 4/1963 | Street | 366/85 |
| 3,170,190 | 2/1965 | Fields | 366/75 |
| 3,193,877 | 7/1965 | Edwards | 366/75 |
| 3,288,443 | 11/1966 | Lynch et al. | 159/2 E |
| 3,305,894 | 2/1967 | Boden et al. | 366/85 |
| 3,525,124 | 8/1970 | Ocker | 425/204 |
| 3,664,795 | 5/1972 | Heinz et al. | 425/208 |
| 3,737,151 | 6/1973 | Schaeffer et al. | 366/75 |
| 3,917,507 | 11/1975 | Skidmore | 366/75 |
| 4,063,718 | 12/1977 | Koch | 366/75 |
| 4,100,244 | 6/1978 | Nonaker | 366/75 |
| 4,167,339 | 9/1979 | Anders | 366/79 |

*Primary Examiner*—Philip R. Coe
*Assistant Examiner*—Thomas W. Epting
*Attorney, Agent, or Firm*—Schwartz, Jeffery, Schwaab, Mack, Blumenthal & Koch

[57] ABSTRACT

The advantages of a twin-screw extruder, especially the good plasticizing and homogenizing effect, are to be retained in the present invention with a simultaneous, above-average degassing output of the extruder. This object is achieved by dividing the twin-screw extruder into two stages (a) the plasticizing and homogenizing stage with a high screw torque and (b) the degassing and discharging stage in which a large, free degassing volume is achieved by a reduction in the screw core, by an enlargement of the screw housing and by adapting the screw diameter to the respective housing diameters in the degassing and discharging stage.

3 Claims, 3 Drawing Figures

TWIN-SCREW DEGASSING EXTRUDER FOR DEGASSING THERMOPLASTIC MATERIALS OR THE LIKE

BACKGROUND OF THE INVENTION

The present invention relates to a twin-screw degassing extruder for removing gases from thermoplastics materials or the like, comprising a plasticizing and homogenizing stage and a degassing and discharging stage.

Two-stage extruders are known for degassing purposes comprising two extruders which are disposed one beside or above the other and which are driven separately (U.S. Pat. No. 3,470,584). The first extruder, which performs the plasticizing and homogenizing work delivers the thermoplastic plastics material into a vacuum chamber where intensive degassing occurs. The degassed material then passes from the vacuum chamber to the second extruder which is designed as a discharging extruder.

Heat-sensitive, pulverulent materials may be processed by means of such a device—the disposition of the two separate extruders ensuring, on the one hand, that the material does not suffer any overheating as a result of excessive shearing and, on the other hand, good degassing being obtained because of the very large vacuum chamber. This arrangement is disadvantageous because two separate drives are necessary and the device requires a great deal of space.

Processing a thermoplastic plastics material, which has to be subjected to intensive degassing during the extruding process, presents many problems. In order to be able to degas a material adequately, large material surfaces are required to be produced. Since, by connecting a vacuum or reduced pressure in the degassing region, a fused mass foams up considerably because of the evaporating, volatile constituents, good degassing may only be achieved, however, when a large, free volume is created inside the extruder for the foaming up process.

The creation of a large, free volume inside a twin-screw extruder is particularly significant, especially when water is added to the thermoplastic material to be processed. This water is heated above the boiling point inside the extruder and thus occurs as water vapour in the vacuum stage, in which the material is relieved of pressure, and the fused mass foams up considerably. The water vapour carries free monomer components along with it whereby excellent degassing of the thermoplastic material may be achieved.

If therefore, it is desired to utilise such a degassing process without eliminating the excellent plasticizing and homogenizing effects of a twin-screw extruder, it is vital to create a very large, free volume inside a twin-screw extruder. On the other hand, however, the screws of a twin-screw extruder which, for the purpose of a good delivery output and automatic cleaning, are in meshing inter-engagement, cannot be reduced at random in respect of the core diameter since then the disengagement of the screw core is no longer guaranteed by the external diameter of the screw webs. The creation of free volume in the case of twin-screw extruders therefore presents considerable problems.

SUMMARY OF THE INVENTION

It is an object of the present invention to design a twin-screw degassing extruder so that good plasticizing and homogenizing results may be obtained therewith, but especially excellent degassing results, even when water is added to the material as a degassing aid ("stripping agent").

According to the present invention there is provided a twin-screw degassing extruder for degassing thermoplastic materials or the like, comprising a plasticizing and homogenizing stage and a degassing and discharging stage, characterised in that the screw members in the degassing and discharging stage have a core diameter which is smaller compared with that of the screw members in the plasticizing and homogenizing stage, in that the twin-screw housing in the degassing and discharging stage has a respective larger internal diameter compared with the respective internal diameter of the twin-screw housing in the plasticizing and homogenizing stage and in that the external diameter of the screw members in the degassing and discharging stage corresponds substantially to the respective internal diameter of the housing.

The advantages of the twin-screw degassing extruder according to the invention are to be seen in that two extremely different operating conditions can be combined together and be carried out in one machine in a very advantageous manner.

A high torque (achieved by a large core diameter) is therefore required for the first stage for plasticizing the material to be processed, and a high shearing gradient (achieved by a short screw pitch depth of equally long core diameters) is required for the homogenizing process and, for example, for intermixing sweeping agents ("stripping agents").

According to the invention, in the second stage, i.e. in the degassing and discharging part, an exceedingly large volume (equally smaller core diameters and larger external diameters) and a slight shearing gradient as a consequence of the greater screw pitch depth are achieved.

To increase the volume provision is additionally made in an advantageous manner for a greater inclination of the screw webs, i.e. the angle between an imaginary vertical line and the screw webs is greater in the degassing and discharging stage than in the plasticizing and homogenizing stage.

Excellent plasticizing and homogenizing effects are therefore achieved in the first stage. The screw speed may be selected freely for the desired discharge without the second stage having to be taken into consideration. Depending upon the diameter ratio selected and proceeding from the first stage, which generally corresponds to the dimensions of the standard extruder, a maximum threefold delivery volume may be achieved for the degassing and discharging stage. The screw core diameter, which is small in this region compared with the standard machine, is acceptable since the already fused material still only requires a relatively low torque for the screw.

In the case of standardized-unit-type screws whose members are drawn on a tension rod or mandrel, the mandrel in the region of the degassing and discharging zone may also be advantageously designed with a reduced diameter so as to facilitate the increase in volume in this region by screw members which are to be drawn onto the mandrel and have an even smaller core diameter.

The design according to the invention for the second stage ensures excellent degassing of the material to be processed because a large, free volume has been created beneath the degassing opening. A large delivery volume is produced (and hence also a large, free volume) because of the considerably reduced core diameter and with a simultaneous enlargement of the internal diameter of the cylinder in the degassing stage.

Because of this feature, the delivery output is considerably increased so that, even if a melted or fused mass foams up considerably, the threads in the degassing region may be prevented from being filled completely.

In addition, the creation of a large, free space ensures that no material can rise upwardly into the degassing opening and disturb the degassing process. By designing the second stage in this manner, an extremely gentle treatment of the material is achieved because there is little shearing of the material and consequently little or no undesirable temperature increase occurs.

BRIEF DESCRIPTION OF THE DRAWINGS

The invention will be described further, by way of example, with reference to the accompanying schematic drawings, in which.

DETAILED DESCRIPTION OF THE DRAWINGS

Figure 1:
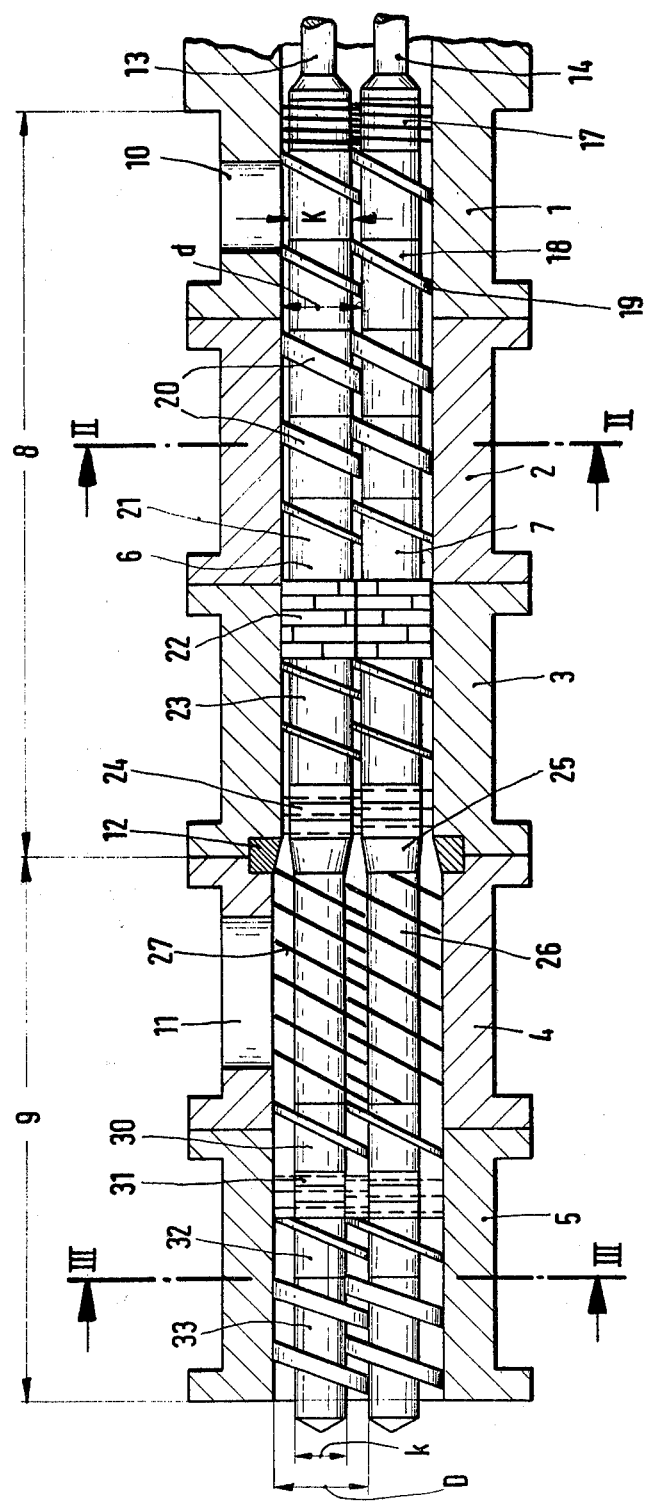
FIG. 1 is a plan view of a twin-screw extruder for removing gas from plastics material.

A twin-screw or worm extruder for degassing plastics materials is illustrated including a plurality of housing portions 1 to 5. Two screws 6 and 7 are located in the housing and mesh one with the other. The twin-screw degassing extruder is composed of a stage 8 which is the plasticizing and homogenizing stage and a stage 9 which is the degassing and discharging stage. A flange is formed on each end of the individual housing portions 1 to 5 so that it is possible to screw-connect the individual portions together.

A filler or feed opening 10 is provided in the housing portion 1 and a degassing opening 11 is provided in the housing portion 4. A ring 12, whose cross-section is substantially trapezoidal, is located on the internal surface of the cylinders between the stages 8 and 9.

The meshing twin-screws 6 and 7 comprise individual screw members which are pulled or drawn on mandrels or tie rods or tension rods 13 and 14. It will be seen from FIG. 3 that the rods 13 and 14 in the degassing section 9 are smaller in diameter than the rods 13 and 14 in the homogenizing section 8, shown in FIG. 2. The individual screw-members are prevented from rotating by means of key fittings 15 and 16. Two screw members 17 are located beside the filler opening 10 and have a return thread so as to preclude thermoplastic material from entering the drive unit (not shown). Located beneath the feed opening 10 are mono-threaded screw members 18 having narrow webs 19, whereby a large entry volume is created in this region. Mono-threaded screw members 20 are also connected to the screw members 18, the members 20 having wider webs and thus making a build-up of pressure possible. Connected to member 20 is a member 21 which in turn passes the material to working or kneading discs 22 in the delivery direction. The particular object of the kneading discs 22 is to make a spreading-out operation possible, i.e. the material to be homogenized is spread out between the ridge or rear surfaces of the kneading discs and the internal wall of the cylinder to form a thin layer.

Members 23 predominantly exert a delivery operation, whilst toothed discs 24 have a mixing function. By "toothed discs" there is to be understood annular-shaped discs having grooves which have been milled-out externally in a semi-circular shape.

A transition piece 25 is provided which is conical and has no profiling. In the degassing and discharging zone 9, multi-threaded screw members 26 with webs 27 are disposed beneath the degassing opening 11. Proceeding from the transition ring 25, the core diameter K in the plasticizing and homogenizing stage is reduced to the core diameter k in the degassing and discharging stage.

At the same time, the internal diameter of the cylinder increases from d in the plasticizing and homogenizing stage to D in the degassing and discharging stage.

Because of the above-mentioned features, the free volume in the degassing and discharging stage is increased substantially 1.5 fold to 2.5 fold.

Figure 2:
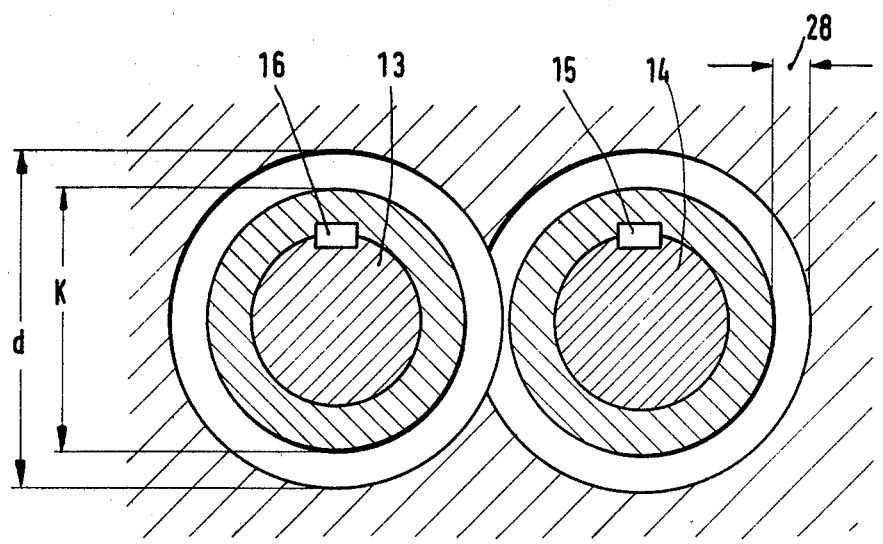
FIG. 2 is a section taken along the line II—II of FIG. 1.
Figure 3:
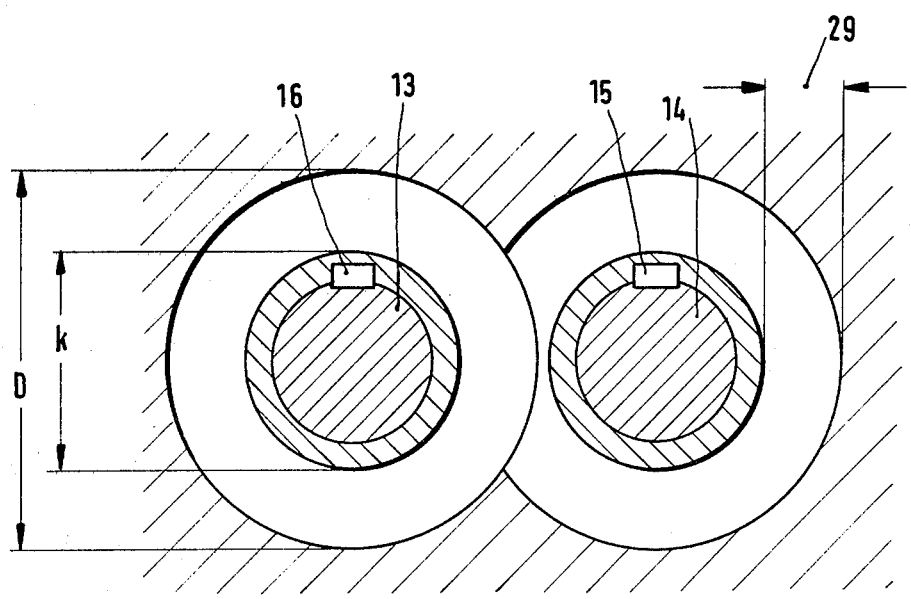
FIG. 3 is a section taken along the line III—III of FIG. 1.

In FIG. 2, the thread depth in the plasticizing and homogenizing stage is denoted by 28 and the thread depth (FIG. 3) in the degassing and discharging stage 9 is denoted by 29.

Connected to the multi-threaded members 26 are mono-threaded members 30, toothed discs 31, mono-pitched members 32 and screw members 33 having wide webs. From here, plastics material enters an injection moulding tool (not shown), for example a profiling head for producing a window-frame section.

In a practical example, ABS powders were introduced into the feed opening 10 and heated to 260° C. Simultaneously with the ABS powder, 1-2% water was poured into the opening 10 and this water was heated to above its boiling point in the plasticizing and homogenizing stage 8. After the material has passed the toothed discs 24 and been conveyed into the degassing and discharging stage 9, a total pressure relief to 10-50 mbar absolute is effected in the multi-threaded member 26 beneath the degassing opening 11. Because of this reduction in pressure, the plastics material foams-up considerably, the bubbles burst open and the water vapour carries with it the monomers, acrylonitriles, styrene, etc. present in the melt mass.

In a comparative test with a twin-screw extruder whose core diameter and external diameter of the screw and the housing remain identical both in the plasticizing and homogenizing stage and in the degassing and discharging stage with a 90 mm screw diameter, a discharge of 800 kg/h was achieved, but the pressure could not be reduced below 300 mbar absolute without the screw threads being completely filled. At a constant maximum speed, therefore, the discharge had to be reduced to 500 kg/h so that an absolute pressure of 20 mbar, which is required for effective degassing could be set without the threads being overfilled.

With an embodiment according to the invention for the twin-screw degassing extruder having a screw diameter of 90 mm in the plasticizing and homogenizing stage and a screw diameter of 97 mm and a core diameter of 65 mm in the degassing and discharging stage, a discharge output of 800 kg/h could be achieved at the identical speed with a pressure of 20 mbar absolute, with excellent degassing being obtained despite the high output.

Only slight additional costs are incurred for the screw members, which are enlarged in this region so as to increase the discharge outputs from 500 to 800 kg/h for the machine.

I claim:

1. A twin-screw degassing extruder for removing gases from thermoplastic materials comprising:
   (a) a housing defining a plasticizing and homogenizing stage, and a degassing and discharging stage, the housing in said degassing and discharging stage having a larger internal diameter when compared with the internal diameter of the housing in said plasticizing and homogenizing stage,
   (b) screw members extending through said stages, the screw members in said degassing and discharging stage having a core diameter which is smaller than the core diameter of the screw members in said plasticizing and homogenizing stage, and the external diameters of the webs of the screw members in said degassing and discharging stage corresponding substantially to the relatively larger internal diameter of the housing in such region,
   whereby a relatively large volume is created in the degassing and discharging stage for improved degassing without affecting the desired results in the plasticizing and homogenizing stage.

2. An extruder according to claim 1, wherein the angle between an imaginary vertical line and webs forming the screw in said degassing and discharging stage is greater than the angle in said plasticizing and homogenizing stage.

3. An extruder according to claim 1, wherein the individual screw members are located on rods which have a smaller diameter in said degassing and discharging stage than the diameter in said plasticizing and homogenizing stage.

* * * * *